United States Patent
Gettemy

(10) Patent No.: US 7,804,493 B2
(45) Date of Patent: *Sep. 28, 2010

(54) DISPLAY SYSTEM

(75) Inventor: Shawn R. Gettemy, San Jose, CA (US)

(73) Assignee: Palm, Inc., Sunnyvale, CA (US)

(*) Notice: Subject to any disclaimer, the term of this patent is extended or adjusted under 35 U.S.C. 154(b) by 1107 days.

This patent is subject to a terminal disclaimer.

(21) Appl. No.: 11/354,215

(22) Filed: Feb. 14, 2006

(65) Prior Publication Data

US 2006/0279557 A1 Dec. 14, 2006

Related U.S. Application Data

(63) Continuation of application No. 10/078,884, filed on Feb. 19, 2002, now Pat. No. 7,006,080.

(51) Int. Cl.
G09G 5/00 (2006.01)

(52) U.S. Cl. .................... 345/175; 178/18.09

(58) Field of Classification Search ........... 345/173, 345/175, 176, 178; 178/18.01, 18.09
See application file for complete search history.

(56) References Cited

U.S. PATENT DOCUMENTS

| | | | |
|---|---|---|---|
| 5,055,840 A * | 10/1991 | Bartlett | 341/31 |
| 5,374,989 A | 12/1994 | Takemura et al. | |
| 5,784,190 A * | 7/1998 | Worley | 359/291 |
| 5,841,411 A * | 11/1998 | Francis | 345/58 |
| 5,900,863 A | 5/1999 | Numazaki | |
| 6,008,486 A | 12/1999 | Stam et al. | |
| 6,057,540 A | 5/2000 | Gordon et al. | |
| 6,088,025 A | 7/2000 | Akamine et al. | |
| 6,243,069 B1 * | 6/2001 | Ogawa et al. | 345/102 |
| 6,243,079 B1 | 6/2001 | Liu | |
| 6,278,443 B1 | 8/2001 | Amro et al. | |
| 6,377,341 B1 | 4/2002 | Rowlen et al. | |
| 6,570,150 B2 | 5/2003 | Tsujii | |
| 6,597,348 B1 | 7/2003 | Yamazaki et al. | |
| 6,900,838 B1 * | 5/2005 | Fujimura et al. | 348/273 |
| 7,006,080 B2 * | 2/2006 | Gettemy | 345/175 |
| 7,450,105 B2 * | 11/2008 | Nakamura et al. | 345/104 |
| 2003/0156121 A1 * | 8/2003 | Willis | 345/606 |
| 2004/0075637 A1 | 4/2004 | Izumi | |

OTHER PUBLICATIONS

*The Technology*, printed from website http://www.poasana.com/pstech.html, Feb. 18, 2002, 2 pages, copyright 2000 Poa Sana, Inc., 295 Kinney Drive, San Jose, CA 95112.

(Continued)

Primary Examiner—Richard Hjerpe
Assistant Examiner—Tom V Sheng
(74) Attorney, Agent, or Firm—Foley & Lardner LLP

(57) ABSTRACT

A display for providing information relating to an object relative to the display is disclosed. The display includes a plurality of pixels, and a plurality of light sensors. An individual light sensor of the plurality of light sensors is provided near an individual pixel of the plurality of pixels. An individual light sensor of the plurality of light sensors is configured to detect light. The information relating to the object relative to the display may be provided by correlating the amount of detected light from the plurality of light sensors to the information relating to the object.

19 Claims, 5 Drawing Sheets

OTHER PUBLICATIONS

*Inkwell Systems*, printed from website http://inkwellsystems.com/technical.htm, About Light Pens from Inkwell Systems—Technical Information, Nov. 27, 2001, 1 page, copyright 1997-2001, Inkwell Systems.

*Ethentica and TactileSense*™, Ethentica, White Paper, "Verified with Tactile Sense," Jun. 2000, 13 pages, Copyright 1997, 1998, 1999, 2000 by Ethentica, Inc., 100 North Pointe Drive, Lake Forest, CA 92639.

\* cited by examiner

FIGURE 6
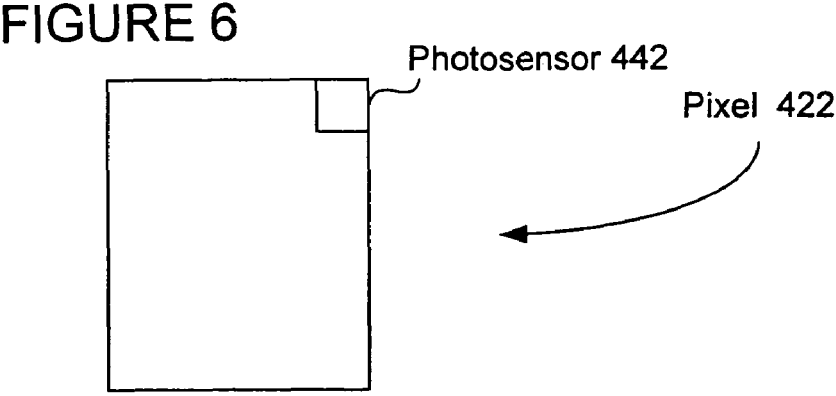
FIGURE 2
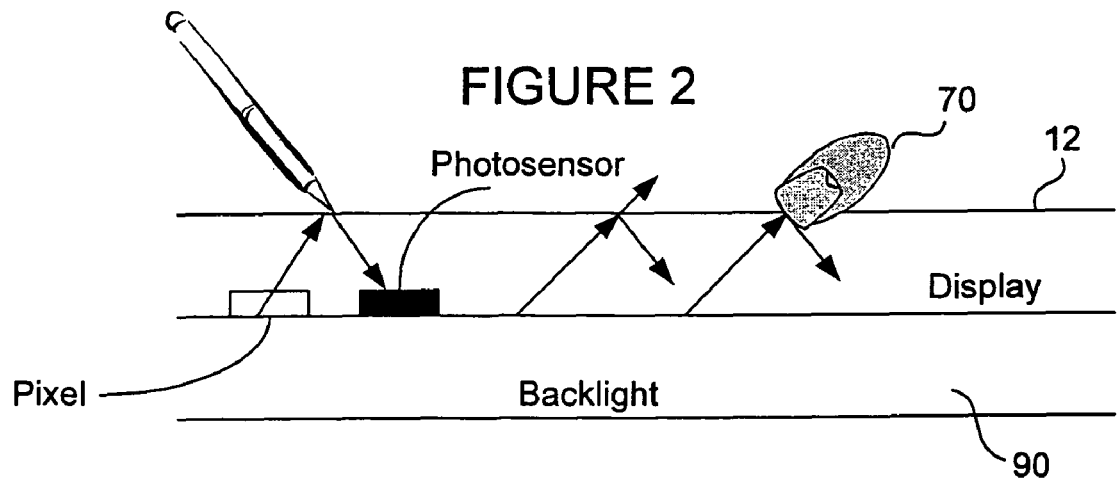
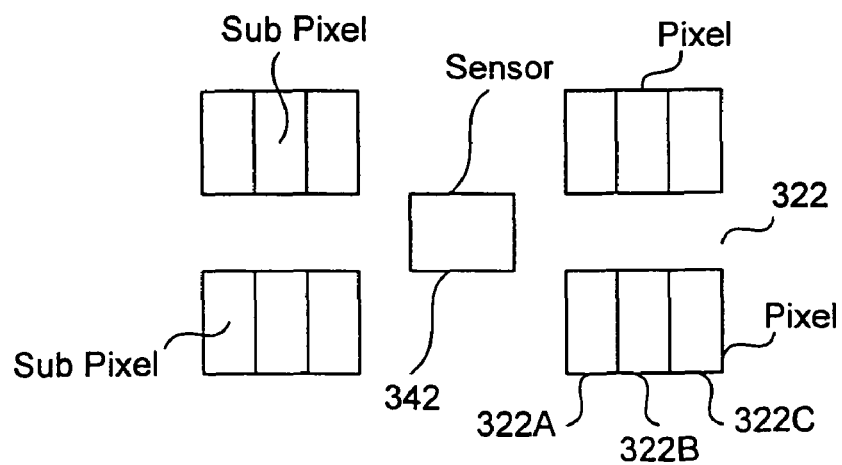
FIGURE 5

DISPLAY SYSTEM

CROSS-REFERENCE TO RELATED APPLICATIONS

This application is a continuation of U.S. application Ser. No. 10/078,884, filed Feb. 19, 2002 and entitled "Display System," the content of which is hereby incorporated by reference.

BACKGROUND OF THE INVENTION

The present invention relates generally to the field of displays. The present invention more specifically relates to the field of interactive displays such as touch screens and touch panels.

It is known to provide for interactive displays such as touch screens and touch panels for use with devices (such as computers, handheld devices, personal digital assistants (PDAs), information kiosks, and the like).

Touch screens allow for interaction (such as user interaction or user interface) with the device via the display. A user may interface with the device or with software via the display, by touching the display in certain areas, inputting text or graphic characters into the device, etc. One such interface may be a Graffiti™ writing section, or other hand recognition software, for tracing alpha numeric characters as input.

Touch screens typically include three layers: a touch panel layer, a display layer below the touch panel layer, and a backlight layer below the display layer. The touch panel layer is the layer that is receptive to motion, touch, position, etc. of objects such as a stylus, pen, pointing device, a human's finger, etc. Typical touch panels may use resistive or capacitive touch panels to provide an interactive display.

Resistive touch panels typically consist of a glass or acrylic panel that is coated with electrically conductive and resistive layers. When operating, an electrical current moves through the touch panel. When pressure is applied to the touch panel, the layers are pressed together, causing a change in the resistance and a touch event is detected.

A capacitive touch screen consists of a glass panel with a capacitive (charge storing) material coating its surface. Sensors located at corners of the screen typically measure the capacitance of an object touching the coated surface. X and Y coordinates of any touch event are then determined based on the relative capacitance measurements made by the four sensors.

These touch panel layers are typically constructed from glass or acrylic. The touch panel layer typically may have a thickness of approximately 2 millimeters. The inclusion of the touch panel layer to the device adds to the overall size (such as thickness) of the device, as well as adding to the weight of the device. As devices such as PDAs become smaller and lighter, there is a need to reduce both the size and weight of the devices. Accordingly, it would be advantageous to provide an interactive display for use with a device, such as a PDA, which would not require a touch panel layer.

Additionally, the touch panel layer may have a transparency of 80-85 percent. That is, light passing through the touch panel will have 80-85 percent of its original brightness or intensity. Due to the touch panel layer, the brightness or intensity of the display layer is diminished. In order to have a certain level of brightness or intensity, the display layer must have a higher output to overcome the losses in the touch panel layer. This in turn places a greater burden or drain on a power source (typically batteries).

Accordingly, it would be desirable to provide an interactive display that would not cause a reduction in the intensity or brightness of the display layer. It would further be advantageous to provide an interactive display that would provide for the level of brightness or intensity of present displays, while also requiring less power than typical displays. It would further be advantageous to provide a display (such as a touch screen) which would provide for user input or interface via the display. The techniques below extend to those embodiments which fall within the scope of the appended claims, regardless of whether they provide one or more of the above-mentioned advantageous features.

SUMMARY OF THE INVENTION

One embodiment of the invention relates to a display for providing information relating to an object relative to the display. The display includes a plurality of pixels, and a plurality of light sensors. An individual light sensor of the plurality of light sensors is provided near an individual pixel of the plurality of pixels. An individual light sensor of the plurality of light sensors is configured to detect light. The information relating to the object relative to the display may be provided by correlating the amount of detected light from the plurality of light sensors to the information relating to the object.

Another embodiment of the invention relates to a handheld device having a display for providing information relating to an object relative to the display. The handheld device includes, data processing electronics, and a display coupled to the data processing electronics. The display includes a plurality of pixels, and a plurality of light sensors. An individual light sensor of the plurality of light sensors is provided near an individual pixel of the plurality of pixels. An individual light sensor of the plurality of light sensors is configured to detect light. The information relating to the object relative to the display may be provided by correlating the amount of detected light from the plurality of light sensors to the information relating to the object.

Another embodiment of the present invention relates to a method of detecting information relating to an object near a screen. The screen has a plurality of pixels and a plurality of light sensors near the pixels. An individual light sensor is provided near an individual pixel. The method includes receiving data corresponding to levels of light with the light sensors, and correlating the information relating to the object near the screen to the sensed level of light of the plurality of light sensors.

Another embodiment of the present invention relates to a display including a plurality of pixels, a plurality of light sensors where an individual light sensor is provided near at least one pixel of the plurality of pixels, a graphics controller coupled to the plurality of pixels, and a logic unit coupled to the plurality of light sensors.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

BRIEF DESCRIPTION OF THE DRAWINGS

The invention will become more fully understood from the following detailed description, taken in conjunction with the accompanying drawings, wherein like reference numerals refer to like elements, in which:

FIG. 2 is a partial cross-section view of the display shown in FIG. 1, taken along the line 2-2;

FIG. 5 is a schematic representation of a display according to an alternative embodiment;

FIG. 6 is a schematic representation of a pixel according to an alternative embodiment.

DETAILED DESCRIPTION OF EXEMPLARY EMBODIMENTS

Referring to the FIGURES, exemplary embodiments of a display (such as an interactive display, touch screen, touch panel, etc.) are shown. The exemplary embodiments of displays provide for user interaction (such as by touching, pointing, placement of objects proximate to the display, etc.) for use in conjunction with various devices (such as computers, handheld devices, personal digital assistants (PDAs), portable computing devices, handheld scanners, mobile telephones, etc.). Exemplary embodiments of a display may employ an array of one or more light sensors integrated into a display surface, to provide for interaction, positioning, and tracking of an object (such as a finger, a stylus, a pointing device, a pen, etc.) near the surface of the display.

Figure 1:
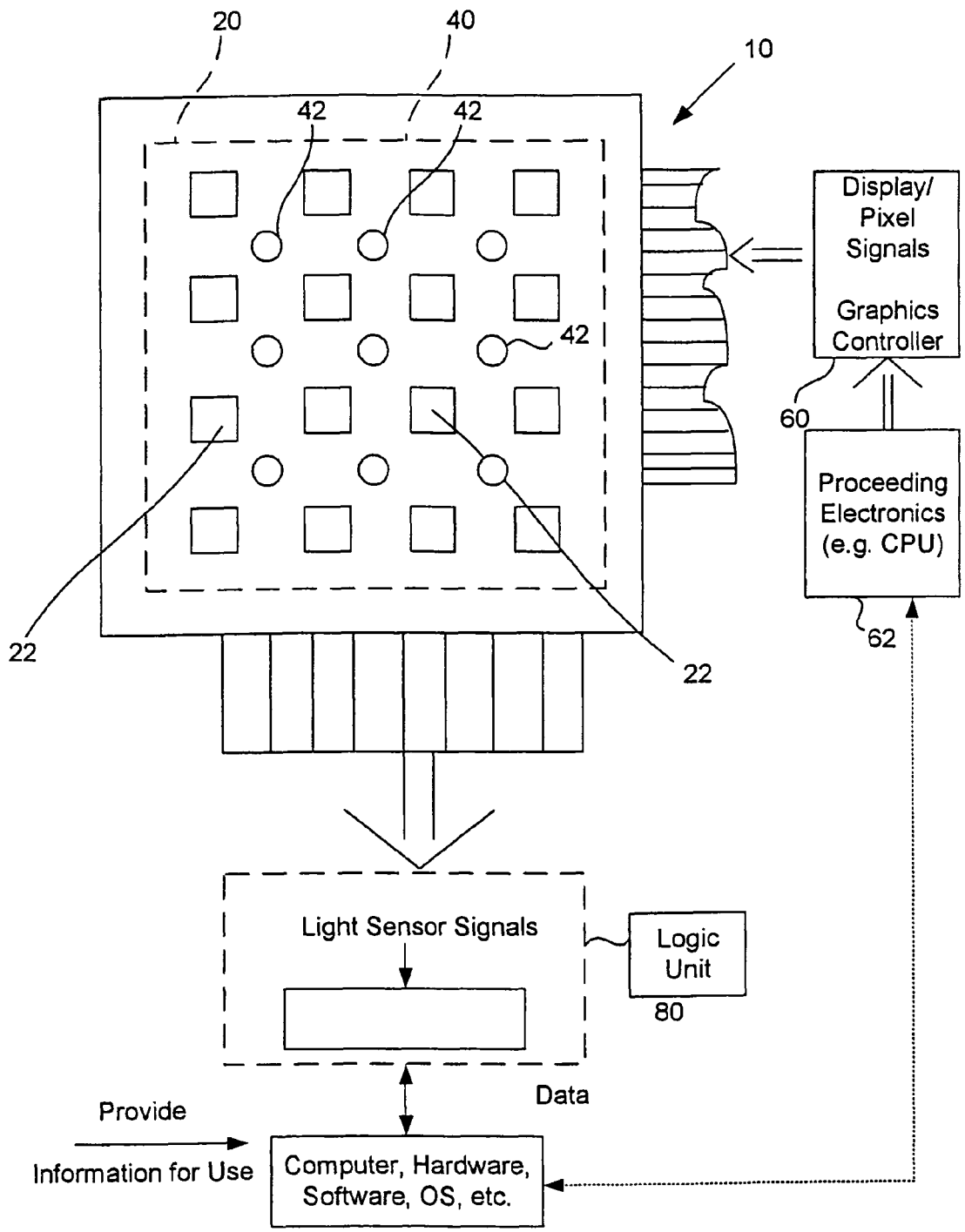
FIG. 1 is a schematic representation of a display according to an exemplary embodiment.

Shown in FIG. 1 is an exemplary embodiment of a display 10. Display 10 includes a plurality of pixels 20, a plurality of light sensors 40, a graphics controller 60, and a logic unit 80. As shown in FIG. 2, when light is emitted from a display (either emanating from pixels 20, from a backlight 90, or from other sources), a certain amount of light will pass through a display surface 12, and a certain amount of light will be reflected or refracted back from display surface 12. When an object 70 is near display 10, object 70 reflects or refracts a certain amount of light which has passed through display surface 12, back toward display 10. By detecting the additional amount of light that is reflected or refracted from object 70, the position of object 70 relative to display 10 may be determined, as will be discussed in greater detail below.

As shown in FIG. 1, display 10 includes pixels 20 provided for displaying information (including text, graphics, images, pictures, and other visual information) on display 10. Pixels 20 may be distributed in an array or grid. Alternatively, pixels may be distributed according to a variety of configurations, orientations, etc. such as a 160×160 pixel matrix, a 320×320 pixel matrix, any number (such as n×m) pixel matrix, a diamond shaped array pixel matrix, an arrangement where the blue pixel of a color display is shared by four neighboring pixels, etc.

Figure 7:
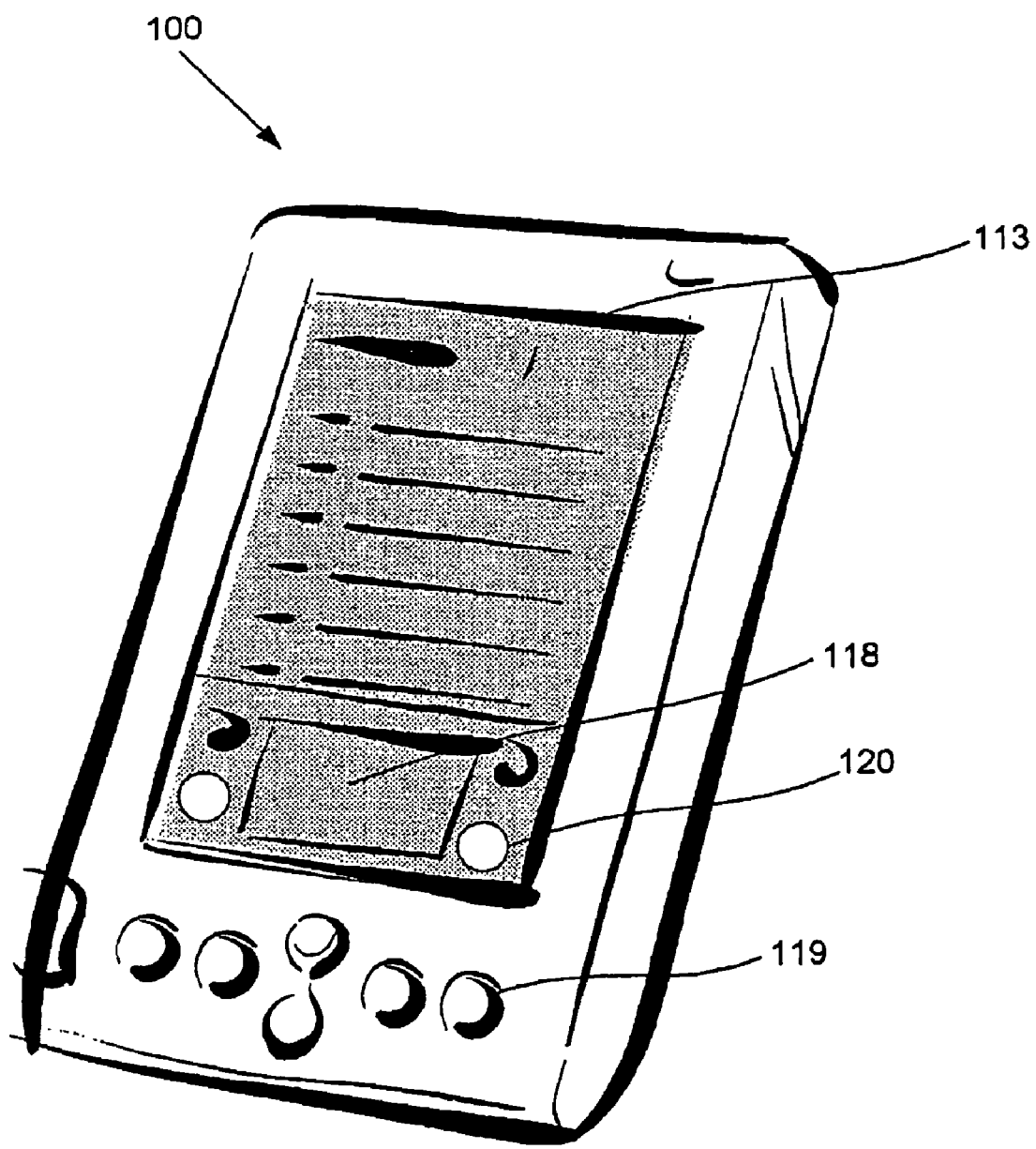
FIG. 7 is a depiction of a handheld device having display according to an exemplary embodiment.

Each individual pixel 22 of pixels 20 is controlled via graphics controller 60. Graphics controller 60 controls various parameters of pixels 20 (such as the color, intensity, brightness, contrast, on/off status, and/or other related control parameters for the pixels), thereby resulting in the display of information on display 10. The combination of individual pixels 22 results in the pixels 20 displaying information on display 10. According to one exemplary embodiment, graphics controller 60 may be coupled to a central processing unit (CPU) 62. CPU 62 may be part of a computing system, computer, handheld device, mobile computing device, etc. As shown in FIG. 7, one exemplary embodiment of display 10 is shown used as a display portion for handheld device 100.

According to an alternative embodiment (as shown in FIG. 2), display 10 may further include a backlight 90. Backlight 90 may provide illumination of display 10 in low lighting conditions. Backlight 90 may also be used to provide a light source which will be reflected by object 70, and which light will be detected by light sensors 40.

As shown in FIG. 1, light sensors 40 (such as photosensors, photo-sensitive elements, a plasma layer excited by a photo-sensor, etc.) may be distributed in an array or grid pattern. According to one exemplary embodiment, light sensors 40 are distributed such that an individual light sensor (shown as individual light sensor 42) is located near four individual pixels 22. Alternatively, light sensors 40 may be distributed in any pattern, configuration, or placement as to allow proper location identification, as will be described below.

According to an alternative embodiment shown in FIG. 5, a light sensor 342 may be provided proximate four individual pixels 322. Each pixel 322 may include three subpixels 322a, 322b, and 322c. In one exemplary embodiment, subpixels 322a-322c allow for the display of color on display 10. Subpixel 322a may correspond to a red hue, subpixel 322b may correspond to a green hue, and subpixel 322c may correspond to a blue hue.

According to an alternative embodiment shown in FIG. 6, light sensor 442 may be provided in a corner of pixel 422. Alternatively, light sensors may be provided in a variety of different positions and orientations with respect to a pixel or plurality of pixels.

According to various exemplary embodiments, the light sensor may be a sensor configured to detect light amount, light intensity, brightness, etc.

According to one exemplary embodiment, light sensor 42 provides an output (such as an electrical signal) in response to an amount of detected light. Light sensor 42 may be tuned to be responsive to certain types of light (i.e. infrared, visible, ultra-violet, other types of electromagnetic radiation, etc.) as well as specific wavelengths, or ranges of wavelengths of light. For example, in one exemplary embodiment, light sensor 42 is configured to detect light in the infrared wavelength. This wavelength may be chosen as the wavelength of light which will be reflected by object 70. For example, if object 70 is a red stylus, light sensor 42 may be configured to detect reflected light corresponding to the wavelength of the reflected red color.

According to one exemplary embodiment, object 70 need not come into contact with display surface 12. Rather, object 70 need only be near display surface 12 such that the reflected light from object 70 may be detected by light sensors 40. Additionally, object 70 may come into contact with display surface 12 and still cause detection of object 70.

According to another exemplary embodiment, light sensors 40 may be configured to detect a change in the index of refraction of pixels 20. This change may occur when object 70 is in contact with display surface 12. For example, a glass to air transition may cause roughly a 5 percent reflection due to the change in the index of refraction. However, a glass to another material (such as a polymer or elastomer) transition may cause a greater that 5 percent reflection due to the change in the index of refraction. Light sensors 40 may be configured to detect such changes.

According to another exemplary embodiment, light sensors 40 may be configured to detect an amount of ambient light present (or absent) due to object 70 from the surrounding environment.

According to another exemplary embodiment, light sensors 40 may be configured to detect either or both the reflected light from object 70, and detect the change in the index of refraction due to object 70.

According to one exemplary embodiment, light sensor 42 may be a charge-coupled device (CCD) (or CCD devices), complimentary metal oxide semiconductor (CMOS) (or CMOS devices), or a variety of other devices that provide for light sensing. According to another exemplary embodiment, pixels 20 and light sensors 40 are integrally formed together. For example, CMOS or CCD devices may be manufactured or assembled simultaneously with the pixels of the display.

As shown in FIG. 1, light sensors 40 are in communication with logic unit 80. According to various exemplary embodiments, logic unit 80 may be a position sensor, an algorithm, hardware, a chip, software, etc. configured to correlate or translate data from light sensors 40 into more useable information such as position, motion, acceleration, shape etc. for use by the device. According to one exemplary embodiment, each light sensor 42 is coupled to logic unit 80. According to another exemplary embodiment, each light sensors 40 may be read as a plurality of charges, and then the individual readings from light sensor 42 may the be determined from the single reading of the plurality of charges (e.g. a plurality of light sensors in a CCD device may be read by taking only one reading) for use by logic unit 80. The signals from light sensors 40 are passed to logic unit 80, so that logic unit 80 can determine the position of object 70 relative to display 10. Once the position of object 70 is determined, the position may then be passed to CPU 62 (or other functional unit such as a memory unit, storage unit, software, operating system (OS), buffer, or other components of the device) for use.

Figure 3A:
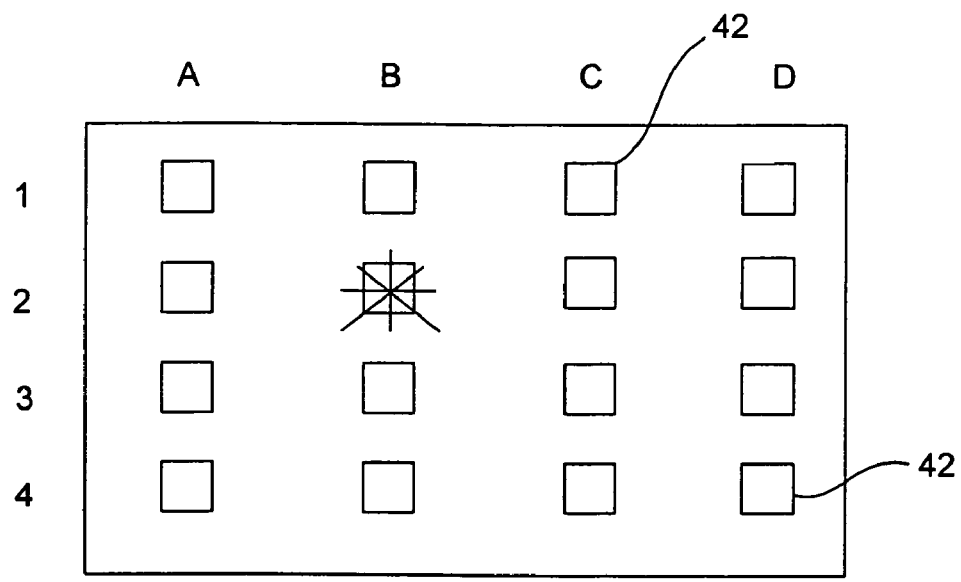
FIGS. 3A-3B are schematic representations of a display in operation, according to an exemplary embodiment.
Figure 3B:
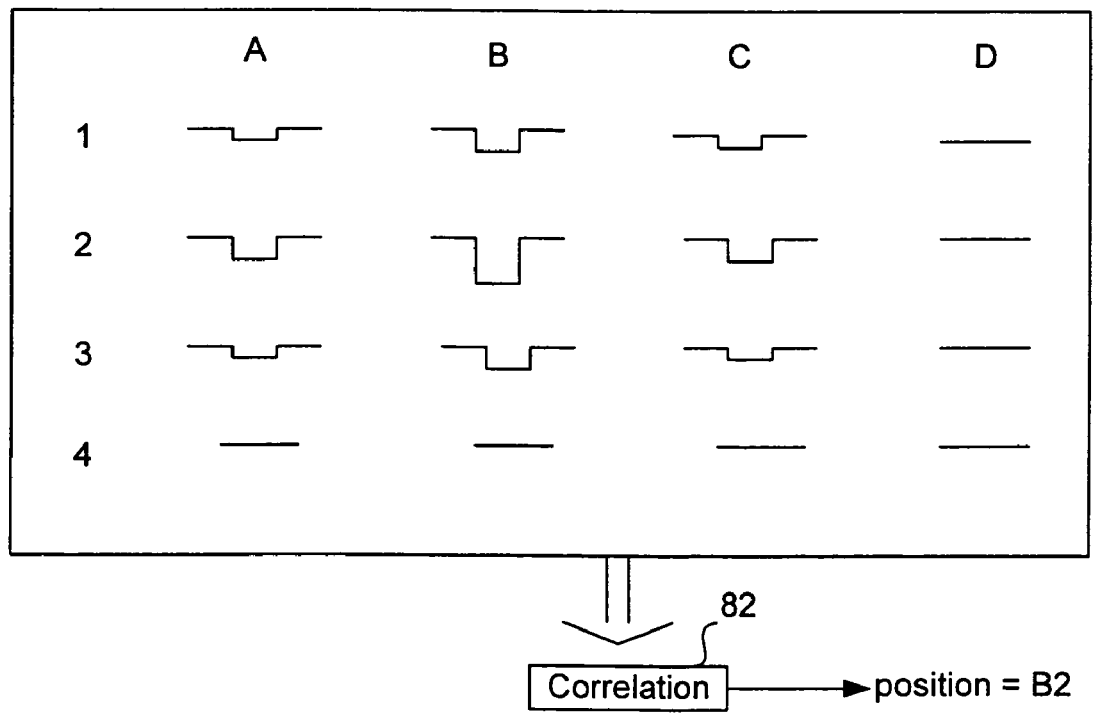

Shown in FIGS. 3A-3B is one exemplary embodiment of a method used by logic unit 80 to determine the location or position of object 70 relative to display 10. A schematic representation of a portion of display 10 is shown with a grid coordinate system in FIG. 3A; the letters A-D representing columns of display 10, and the numbers 14 representing rows of display 10. Each light sensor 42 is labeled for reference with a coordinate point such as A1, C3, B4, D2, A4, etc. For purposes of this example, assume that object 70 is placed on or near light sensor coordinate B2. The presence of object 70 will cause an amount of light to be reflected off of object 70. Each light sensor 42 will detect an amount of light reflected off of object 70, and each light sensor 42 may detect a different amount of light than neighboring light sensors. FIG. 3B is a schematic representation of the state of each light sensor in the coordinate system relative to a reference value. The state of each light sensor is then passed to a correlation step 82. Correlation step 82 may search the light detector data for a maximum or minimum value in order to determine a position. As shown in FIG. 3B, light detector B2 is shown to have the highest amount of reflected light relative to the reference value. Light detectors A2, B1, B3, and C2 have the next highest amount of detected light. Light detectors A1, A3, C1, and C3 have the next highest amount of detected light. Light detectors A4, B4, C4, and D1 to D4 have the lowest amount of detected light. Accordingly, because light detector B2 has the highest amount of detected light, the position coordinate B2 may then be identified as the position of object 70 relative to display 10. This information may then be passed to CPU 62 (or other functional unit) for use. Alternatively, the position coordinate may be correlated to a pixel, a group of pixels, an area on the screen, etc.

According to another exemplary embodiment, logic unit 80 may be configured to compare the light sensor signals with an expected readout value. For example, when display 10 uses an LCD, and when a graphic is provided on display 10, certain pixels will be darkened, and other pixels will remain transparent. The condition of the pixels may cause light detectors 40 to register a shadow due to the graphic, and not due to the presence of object 70. Logic unit 80 might erroneously detect lighting conditions due to the graphic, and interpret it as information relating to object 70. Logic unit 80 may be in communication with the CPU or graphics controller. Logic unit 80 may be provided with an expected value for the light sensors displaying the graphic, and compare those values with the actual detected light. Logic unit 80 may subtract off the effect of the displayed information in order to isolate the effect of object 70 near the display. A comparison table, calibration chart, etc. may be used to determine what effect the pixels may have on the light sensors. Alternatively, the CPU or other processing electronics may be used to subtract off the effect of the displayed information in order to isolate the effect of object 70 near the display.

According to another exemplary embodiment, a variety of information relating to the object may be detected including position of the object, velocity of the object, direction of motion of the object, acceleration of the object, etc.

According to one exemplary embodiment, the information relating to the object (i.e. position, direction of motion, velocity, etc.) is provided to data processing electronics (such as a CPU 62) to determine the position of object 70 relative to display 10 in response to a required input (such as requiring a user to point to a specific area on the display). In another exemplary embodiment, the information relating to the object is provided to data processing electronics (such as a CPU 62) to determine or interpret the motion of object 70 into an alpha-numeric text characters (e.g. Graffiti™, etc.) for use with text processing programs, user programs, operating systems, etc.

Figure 4:
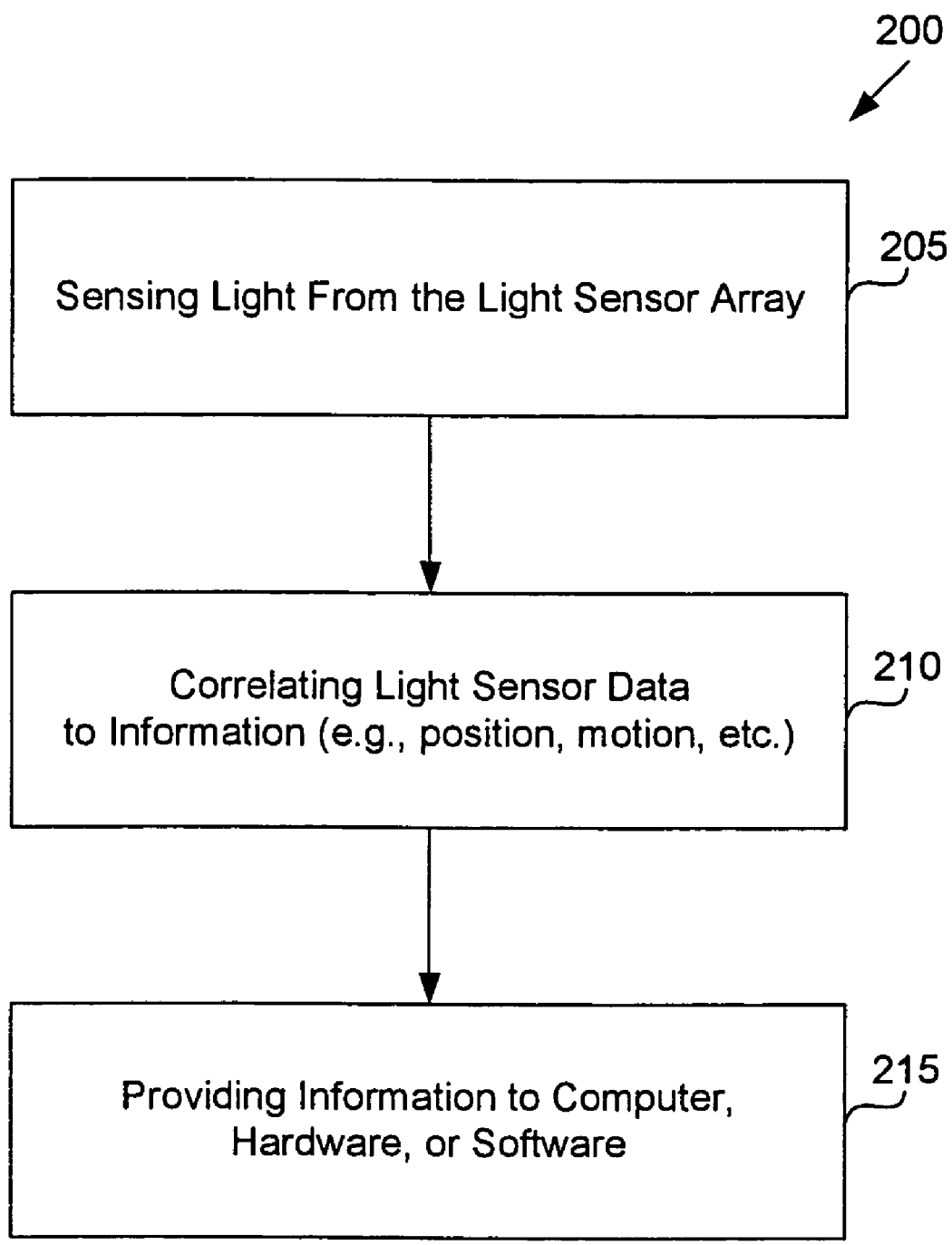
FIG. 4 is a flow chart showing a method for determining a position of an object relative to a screen, according to an exemplary embodiment.

Referring to FIG. 4, an exemplary embodiment of a method 200 of providing interaction of an object and a display is shown. Method 200 includes sensing light at a plurality of locations (step 205). Sensing light at a plurality of locations (step 205) may be done with an array of light sensors, with a charge-coupled device (CCD) (or CCD devices), from a complimentary metal-oxide semiconductor (CMOS) image sensor (or CMOS sensing devices), a combination of these devices, and/or a variety of other devices that provide for light sensing. According to one exemplary embodiment, the sensed light is an amount of light. According to a second exemplary embodiment, the sensed light is light intensity. Alternatively, the sensed light may be lumens, etc. The light which has been sensed at the plurality of locations is then correlated to provide data relating to the object (step 210). According to one exemplary embodiment, the data relating to the object is correlated to the light which has been sensed by identifying coordinate positions of the light sensors which have sensed a maximum amount of light. The coordinate position data of the object is then provided to a CPU, memory module, computer hardware, or computer software for use (step 215).

Referring to FIG. 7, a handheld device 100 is depicted, according to one exemplary embodiment. Handheld device 100 may include Palm™ style computers manufactured by Palm, Inc., of Santa Clara, Calif. Other exemplary embodiments of the invention may include Windows CE™ or PocketPC™ handheld computers or other handheld computers or personal digital assistants, as well as cellular telephones, and other mobile computing devices.

Handheld device 100 may include interactive hardware and software that performs functions such as maintaining calendars, phone lists, task lists, notepads, calculation applications, spreadsheets, games, and other applications capable of running on a computing device. Handheld device 100, depicted in FIG. 7 includes a plurality of input functions, keys 119 and a display 113 having graphical user interface features according to the present invention. Display 113 may be provided with an interface that allows a user to select an altered display content using a pointer, such as, but not limited to, a stylus. In an exemplary embodiment, display 113 also includes a Graffiti™ writing section 118, or other hand recognition software, for tracing alpha numeric characters as input. A plurality of input buttons 120 for performing automated or preprogrammed functions may be provided on a portion of display 113. In a particular embodiment, display 113 is a touch screen display that is electronically responsive to movements of a stylus (or other pointing device, such as but not limited to a fingertip or pen tip) on or near the surface of display 113. Display 113 may include a liquid crystal display (LCD), a thin film transistor (TFT) display, a micro-machine mirror display, and other back lit, side lit, refractive or reflective displays which incorporate the integrated light sensors in pixel circuitry for digitizer functionality as disclosed in the present application.

According to various exemplary embodiments, logic unit 80 may be configured to distinguish size of shadows detected by light sensors 40. For example, logic unit 80 may be configured to distinguish a larger shadow as compared to a smaller shadow. As an example, the larger shadow may correspond to a hand resting on the display, and the smaller shadow may correspond to the object 70 near the display. Alternatively, the processing electronics, OS, etc. may distinguish shadow sizes.

According to one exemplary embodiment, the screen may need to be provided with a higher amount backlight in order to detect higher levels of detail. For example, if display 10 uses a liquid crystal display (LCD), and the LCD is substantially darkened, additional light may need to be provided in order to be reflected, and thereby detected. The panel may be designed to allow light (including non-visible light) through the panel for detection. Alternatively, the panel may be provided with light guides to allow the light to pass through the darkened display layer. The light which passes through the darkened display layer may then be reflected by object 70, and then detected. An example of light guides which may be used in association with display 10 is disclosed in U.S. application Ser. No. 09/997,532, filed Nov. 29, 2001, titled "Light Guide Spacers for Backlighting a Reflective Display," the entire disclosure of which is hereby incorporated by reference.

According to another exemplary embodiment, a filter may be provide on the sensor to tune the sensor to a particular wavelength. For example, the filter may be a plastic or polymer which allows one or more wavelengths to pass. The filter may be provided in a variety of locations, including on the top of the sensor. Alternatively, the sensor may be tuned to specified wavelengths using other tuning mechanisms.

It is also important to note that the construction and arrangement of the elements of the display system shown in the exemplary embodiments are illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, colors, etc.) without materially departing from the novel teachings and advantages of the subject matter recited in the claims. For example, the level of sensitivity of the light sensors may be adjusted to eliminate unwanted registrations from dust, smudges, etc. on the screen, while still registering object information. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present inventions as expressed in the appended claims.

What is claimed is:

1. A display device, comprising:
   a plurality of pixels for generating a display image;
   a plurality of light sensors, wherein each light sensor is positioned near at least one pixel, and wherein each light sensor is configured to sense light; and
   a processor coupled to the light sensors configured to determine information associated with an object near the display device based on the light sensed by the light sensors, wherein the processor determines information associated with the light sensed by the light sensors by compensating for the effect of light emitted by the plurality of pixels, wherein the effect of the light emitted by the plurality of pixels is a lower light level being detected in a portion of the plurality of light sensors as compared with others of the plurality of light sensors; wherein the compensation is determined by subtracting the effect of the light emitted by the plurality of pixels; and wherein the effect of the light emitted by the plurality of pixels is a lower light level being detected in a portion of the plurality of light sensors as compared with others of the plurality of light sensors.

2. The display device of claim 1, further comprising a computing device coupled to the display device.

3. The display device of claim 2, wherein the computing device is a handheld computing device.

4. The display device of claim 1, wherein the processor compensates for the effect of the light emitted by the plurality of pixels by subtracting the effect of the light emitted by the plurality of pixels from the light sensed by the light sensors.

5. The display device of claim 4, wherein the display device further comprises a graphics controller, and the processor receives the effect of the light emitted by the plurality of pixels from the graphics controller.

6. The display device of claim 1, wherein the information associated with the object is at least one of a location of the object, a motion of the object, and a direction of motion of the object.

7. The display device of claim 1, wherein the light sensors detect an amount of light.

8. The display device of claim 7, wherein the amount of light is an amount of reflected light.

9. A display device, comprising:
   a plurality of pixels for generating a display image;

a plurality of light sensors, each light sensor being positioned next to at least one pixel, each light sensor being configured to detect light; and a graphics controller coupled to a processor;

wherein the processor receives the effect of the plurality of pixels generating the display image from the graphics controller; and wherein the processor determines information associated with an object near the display device based on subtracting the effect of light emitted by the plurality of pixels from the light levels sensed by the plurality of light sensors, wherein the effect of the light emitted by the plurality of pixels is a lower light level being detected in a portion of the plurality of light sensors as compared with the remainder of the plurality of light sensors.

10. The display device of claim 9, wherein the information associated with the object is at least one of a location, a motion, a direction of motion, and a speed of motion.

11. The display device of claim 9, wherein the plurality of light sensors detect at least one of an amount of light, an amount of reflected light, and an amount of visible light.

12. The display device of claim 9, further comprising a computing device coupled to the display device.

13. The display device of claim 12, wherein the computing device is a handheld computing device.

14. A method for determining information associated with an object near a display, comprising:

providing a plurality of light sensors for sensing light, each light sensor being positioned near at least one of a plurality of pixels;

determining the effect of light emitted from at least a portion of the plurality of pixels;

sensing a change in light via at least one of the plurality of light sensors due to an object being near the display; and determining the information associated with the object near the display based on compensating for the effect of the light emitted from the plurality of pixels via the at least one light sensor, wherein the effect of the light emitted by the plurality of pixels is a lower light level being detected in a portion of the plurality of light sensors as compared with others of the plurality of light sensors ; wherein the compensation is determined by subtracting the effect of the light emitted by the plurality of pixels; and wherein the effect of the light emitted by the plurality of pixels is a lower light level being detected in a portion of the plurality of light sensors as compared with others of the plurality of light sensors.

15. The method of claim 14, further comprising:

tuning the plurality of light sensors to sense light having a wavelength within a particular range that includes visible light.

16. The method of claim 14, wherein the information associated with the object is at least one of a location, a motion, a direction of motion, and a speed of motion.

17. The method of claim 14, wherein the plurality of light sensors and the plurality of pixels are provided on a computing device.

18. The method of claim 17, wherein the computing device is a handheld computing device.

19. The method of claim 14, wherein compensating for the effect of the light emitted from the plurality of pixels includes subtracting the effect of the light emitted from the plurality of pixels from the change in light sensed via at least one of the plurality of light sensors due to an object being near the display.

* * * * *